United States Patent [19]

McGahee

[11] 3,936,971

[45] Feb. 10, 1976

[54] FLY FISHING APPARATUS AND QUICK CONNECTOR THEREFOR

[75] Inventor: Welbourne D. McGahee, Melbourne, Fla.

[73] Assignee: Loop-A-Line, Inc., Melbourne, Fla.

[22] Filed: Feb. 19, 1974

[21] Appl. No.: 443,872

[52] U.S. Cl.................................. 43/44.83; 43/44.8
[51] Int. Cl.²......................................... A01K 91/04
[58] Field of Search................ 43/44.83, 43.16, 44.8

[56] References Cited
UNITED STATES PATENTS

| | | | |
|---|---|---|---|
| 683,750 | 10/1901 | Guindon | 43/43.16 |
| 1,471,959 | 10/1923 | Halferty | 43/44.83 |
| 2,748,524 | 6/1956 | Schinzel | 43/44.83 |
| 2,754,615 | 7/1956 | Toil | 43/44.83 |
| 3,241,201 | 3/1966 | Chester | 43/44.83 X |
| 3,477,164 | 11/1969 | Novak | 43/44.8 X |

FOREIGN PATENTS OR APPLICATIONS

| | | | |
|---|---|---|---|
| 26,131 | 1902 | United Kingdom | 43/44.83 |

*Primary Examiner*—Louis G. Mancene
*Assistant Examiner*—Daniel J. Leach
*Attorney, Agent, or Firm*—Warren E. Ray

[57] ABSTRACT

Fly fishing apparatus including a double-ended special connector having horizontal and vertical eyes at each end between the fishing line and a leader connected to a fishing hook also having a horizontal and vertical eye whereby the cutting of lines and tieing of knots is eliminated. In modifications the upper end of the double-ended special connector is provided with a horizontal eye only for receiving the knob of a plastic fishing line resulting from the application of heat or for receiving the fishing line with a knot therein.

7 Claims, 4 Drawing Figures

FLY FISHING APPARATUS AND QUICK CONNECTOR THEREFOR

BRIEF SUMMARY OF THE INVENTION

This invention provides a double-ended special connector whereby fly fishing lines and fly fishing hooks with leaders may be rapidly connected and disconnected without the cutting of lines or tieing of knots except in modifications where this may be necessary only with the line to the rod. The cutting of the line to the rod would seldom be necessary in any event as the leader and hook with fly may be exchanged without removal of the line to the rod. While a conventional hook may be used this invention provides a hook with a horizontal and vertical eye similar to that disclosed for the special connector. The apparatus provides a solution to hitherto unsolved problems regarding fly fishing.

The primary object of the invention is the provision of a double-ended special connector whereby the rapid exchange of fishing apparatus is facilitated.

Another object is to provide such a double-ended special connector with a modified upper end so as to cooperate with a fishing line knob or knot;

Further objects and advantages will clearly appear from a description of preferred embodiments as shown in the accompanying drawing, in which:

DETAILED DESCRIPTION

Figure 1:
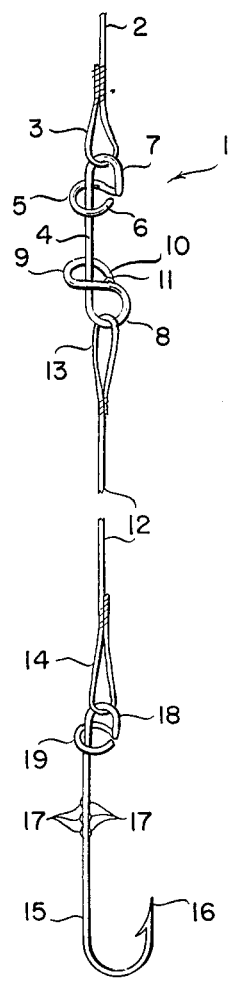
FIG. 1 shows the special double-ended connector with fishing line, leader, and fly hook connected thereto.

It will be understood that some of the elements are exaggerated in the drawing for the purpose of illustration as most parts associated with fly fishing apparatus are quite small. Further, the several views are somewhat pictorial for simplicity as conventional side and top views would not adequately disclose the invention.

Turning now to the drawing, FIG. 1 shows the double-ended special connector with fly rod fishing line and leader and hook attached. The numeral 1 generally indicates the fly fishing apparatus. The fly fishing line 2 from the rod is provided with a loop 3 with the manner of connection to the connector being described with regard to FIG. 2. The special connector has a central shank 4 connected to an upper vertical eye 7 which in turn is connected to an upper horizontal eye 5 encircling the central shank 4 and having an end 6. A lower vertical eye 8 is connected to the central shank 4 and also to a lower horizontal eye 9 having an end 10 which may complete the lower horizontal eye by having a brasing material 11 filling the gap. A brazing material may also be used to fill similar gaps in the remaining figures when the special connector is produced by wire bending rather than by a method that produces an integral joint. The upper vertical and horizontal eye members are normally slightly larger than the lower counterparts since the fly fishing line is usually somewhat larger in diameter than the leader 12. The leader is provided with an upper leader eye or loop 13 and a lower leader loop 14 enlarged sufficiently to permit engagement with the lower vertical eye of the special connector and with the vertical eye 18 of the fishhook having a point 16 and shank 15 with protuberances 17 to aid in preventing the fly material from rotating. The vertical eye 18 on shank 15 is connected to a horizontal eye 19 that encircles the shank 15.

With this arrangement the necessity of tieing the leader to the fly and the cutting of the leader to change to another fly is avoided, thus saving time and leader material. The same advantages are obtained when it becomes desirable to change leaders (lighter to heavier, or vice versa). The manner in which the line and the leader are connected to the special connector and to the fishhook will be described in conjunction with the description of the structure of the remaining figures.

Figure 2:
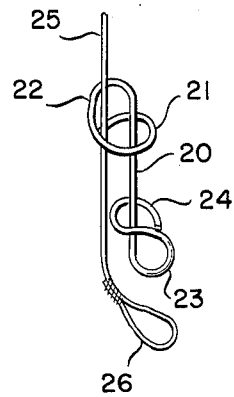
FIG. 2 is similar to FIG. 1 wherein the upper eye is reversed and also shows how the fly rod fishing line is attached to the double-ended connector.

The special connector of FIG. 2 is similar to that shown in FIG. 1 except that the upper horizontal eye is reversed as exemplary of all of the horizontal eyes in all of the figures since this feature is not critical. The central shank 20 extends upward to an upper vertical eye 22 which is connected to an upper horizontal eye 21 encircling the shank 20. The lower end of shank 20 extends to a lower vertical eye 23 which is connected to a lower horizontal eye 24 encircling the shank 20. The loop 26 in fly fishing line 25 is passed through the upper horizontal eye 21 adjacent the central shank 20 and over the lower horizontal eye 24 and lower vertical eye 23. A pull on the line 25 will place the loop in the position shown in FIG. 1. It will be apparent that the loop 26 could also be passed over the flyhook with leader (if in place as seen in FIG. 1) with the same result.

Figure 3:
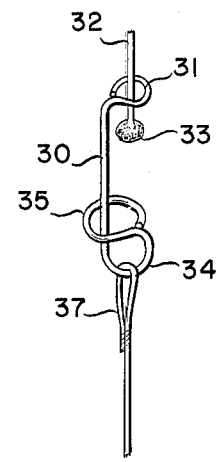
FIG. 3 depicts a modification of the double-ended connector and also shows how the leader is connected to the hook.
Figure 3:
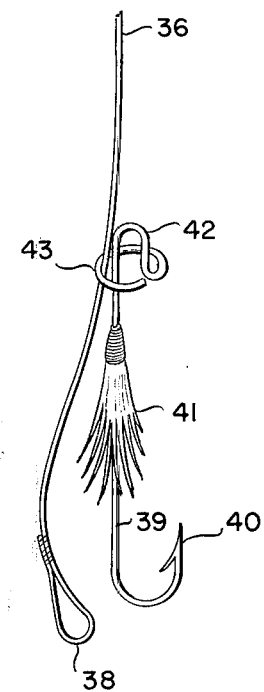

In the modification shown in FIG. 3 the upper vertical eye has been eliminated. Shank 30 culminates in upper horizontal eye 31 so that fly fishing line 32 from the reel may be passed through eye 31 and be retained therein by a knob 33 produced by the application of heat (melting) from a match or cigarette lighter when the fly fishing line is plastic or nylon as well known to fishermen. The lower end of shank 30 is provided with a vertical eye 34 which in turn is connected to a lower horizontal eye 35 encircling the shank 30. The leader 36 is provided with an upper loop 37 which is somewhat larger than the lower leader loop 38. The fishhook is provided with a shank 39 having fly material 41 (exemplary) and the usual point 40. The shank 39 is provided with an upper vertical eye 42 which is connected to an upper horizontal eye 43 encircling the shank 39. The leader 36 is connected to the hook by passing lower leader loop 38 through the upper horizontal eye 43 adjacent the shank 39 and over the point 40 when a pull on the leader will place it in the position shown in FIG. 1.

Figure 4:
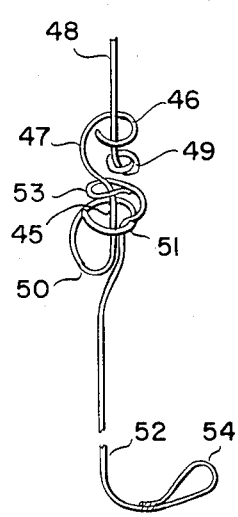
FIG. 4 illustrates another modification of the double-ended connector and also shows a step in attaching the leader to the special connector.

Still another modification is illustrated in FIG. 4 wherein the shank 45 is provided with an upper horizontal eye 46 and with an outward bend 47 in the shank 45. The bend 47 is desirable to accommodate the knot 49 in fly fishing line 48 so that the entire assembly has a straight in-line pull. The shank 45 has a lower vertical eye 50 which culminates in lower horizontal eye 51 encircling the shank 45. The leader 52 is provided with an upper leader loop 53 which may be slightly larger than the lower leader loop 54. Without the hook on the leader, the leader 52 may be attached to the special connector with or without the fly fishing line 48 in place. The upper leader loop 53 is passed over the lower horizontal eye 51 adjacent the shank 45 (as in FIG. 4), and then the lower leader loop 54 is passed through the lower horizontal eye 51. A pull on the leader will cause the leader to assume the position shown in FIG. 1. It will now be apparent that the leader 51 may be connected to the special connector with or without the line 48 being present, but the flyhook must be attached as a last operation as described with reference to FIG. 3. While a special fishhook has been disclosed it will be apparent that an ordinary fishhook could be utilized provided the hook eye is large enough to pass the lower leader loop 54.

In summary it will be apparent that fly fishing apparatus including a special connector has been provided wherein no cutting or tieing of the leader with hook is involved in all figures whereby the flyhook may be rapidly exchanged in less time and with minimum difficulty. While tieing or cutting of the fly fishing line in FIGS. 3-4 may occasionally be necessary this too is eliminated in FIGS. 1-2.

While for purposes of description I have shown and described specific embodiments of my invention, it will be apparent that changes and modifications can be made therein without departing from the spirit of my invention or the scope of the appended claims.

I claim:

1. Fly fishing apparatus comprising a double-ended special connector, said connector including a central shank, a lower vertical eye connected to said central shank, a lower horizontal eye closing upon itself connected to said lower vertical eye and encircling said central shank, a first means on the upper end of said central shank for receiving a fly fishing line, a leader, an upper enlarged loop on said leader for engagement with said lower vertical eye, a lower enlarged loop on said leader, and a second fishing implement means connected to said leader lower enlarged loop, said lower horizontal eye having substantial diameter relative to said central shank so as to provide sufficient space to pass said upper enlarged loop on said leader.

2. Fly fishing apparatus according to claim 1 wherein said lower horizontal eye closing upon itself includes brazing material to effect the closing.

3. Fly fishing apparatus according to claim 1 wherein said second fishing implement means includes a fly fishhook.

4. Fly fishing apparatus according to claim 1 wherein said first means on the upper end of said central shank includes a horizontal eye closing upon itself connected to said central shank for receiving and retaining a knob on said fly fishing line produced by heat.

5. Fly fishing apparatus according to claim 1 wherein said first means on the upper end of said central shank includes an upper horizontal eye closing upon itself connected to said central shank, said central shank having an outward bend adjacent said upper horizontal eye whereby said outward bend accommodates a knot in said fly fishing line for retaining said fly fishing line in a straight-line pull relationship with respect to said upper horizontal eye on said special connector.

6. Fly fishing apparatus according to claim 1 wherein said first means includes an upper vertical eye connected to said central shank for receiving an enlarged loop in said fishing line, and an upper horizontal eye closing upon itself connected to said upper vertical eye and encircling said central shank providing sufficent space relative to said central shank to pass a loop in said fly fishing line.

7. Fly fishing apparatus comprising a double-ended special connector, said connector including a central shank, a lower vertical eye connected to said central shank, a lower horizontal eye closing upon itself connected to said lower vertical eye and encircling said central shank, a first means on the upper end of said central shank for receiving a fly fishing line, a leader, an upper enlarged loop on said leader for engagement with said lower vertical eye, a lower enlarged loop on said leader, said lower horizontal eye having substantial diameter relative to said central shank so as to provide sufficient space to pass said upper enlarged loop on said leader, and a second fishing implement means including a fly fishhook connected to said leader lower enlarged loop, said fly fishhook comprising a shank, anti-rotational fly material protuberances on said shank, a vertical eye connected to said fly fishhook shank for receiving said lower enlarged loop on said leader, a horizontal eye connected to said fishhook vertical eye and encircling said fishhook shank providing sufficient space relative to said fishhook shank to pass said lower enlarged loop on said leader.

* * * * *